US007477322B2

(12) United States Patent
Hsieh

(10) Patent No.: US 7,477,322 B2
(45) Date of Patent: Jan. 13, 2009

(54) APPARATUS AND METHOD FOR DISPLAYING AND CONTROLLING AN ON-SCREEN DISPLAY MENU IN AN IMAGE DISPLAY DEVICE

(75) Inventor: Kuan-Hong Hsieh, Tu-Cheng (TW)

(73) Assignee: Hon Hai Precision Industry, Ltd., Co., Tu-Cheng, Taipei Hsien (TW)

( * ) Notice: Subject to any disclaimer, the term of this patent is extended or adjusted under 35 U.S.C. 154(b) by 490 days.

(21) Appl. No.: 11/024,899

(22) Filed: Dec. 28, 2004

(65) Prior Publication Data
US 2005/0185095 A1    Aug. 25, 2005

(30) Foreign Application Priority Data
Feb. 23, 2004   (CN) .......................... 2004 1 0015467

(51) Int. Cl.
*H04N 5/50*    (2006.01)
(52) U.S. Cl. ..................... 348/569; 715/821; 715/822; 715/810
(58) Field of Classification Search ................ 348/569, 348/570, 563, 564; 715/810–845; 725/37–52
See application file for complete search history.

(56) References Cited

U.S. PATENT DOCUMENTS

| 5,212,553 | A  |   | 5/1993  | Maruoka ..................... 358/188 |
| 5,673,087 | A  |   | 9/1997  | Choi et al. .................. 348/511 |
| 6,005,601 | A  | * | 12/1999 | Ohkura et al. ................. 725/52 |
| 6,281,895 | B1 | * | 8/2001  | Jeong .......................... 715/810 |
| 6,411,337 | B2 | * | 6/2002  | Cove et al. ................... 348/563 |
| 6,646,685 | B1 | * | 11/2003 | Kim ............................ 348/569 |
| 6,856,332 | B2 | * | 2/2005  | Kim ............................ 715/810 |

FOREIGN PATENT DOCUMENTS

| CN | 1243990 A | 2/2000 |
| CN | 1458565 A | 11/2003 |

* cited by examiner

*Primary Examiner*—M. Lee
(74) *Attorney, Agent, or Firm*—Morris, Manning & Martin LLP; Tim Tingkang Xia

(57) ABSTRACT

An apparatus for displaying and controlling an OSD menu in an image display device includes a key input unit (10), a control unit (11), an OSD menu generation unit (12), a storage unit (13), an image signal output unit (14), a pre-amplifier (15), an image output unit (16), and a liquid crystal display (LCD) (17). The key input unit is for outputting a command signal for displaying and controlling function control targets in the OSD menu. The control unit is for determining whether to move and adjust the function control targets. The OSD menu generation unit is for outputting OSD image signals. The image signal output unit is for outputting image signals. The pre-amplifier is for converting the image signals and the OSD image signals. The image output unit is for amplifying and outputting the converted signals. The LCD is for displaying the converted signals from the image output unit.

22 Claims, 9 Drawing Sheets

APPARATUS AND METHOD FOR DISPLAYING AND CONTROLLING AN ON-SCREEN DISPLAY MENU IN AN IMAGE DISPLAY DEVICE

BACKGROUND OF THE INVENTION

1. Field of the Invention

The present invention relates to an on-screen display (OSD) apparatus and method, and particularly to an apparatus and method for displaying and controlling an OSD menu in an image display device such as a television.

2. Related Art of the Invention

In an image display device such as a television, parameters of the display such as volume, brightness, contrast, horizontal size, horizontal position, vertical size and vertical position can be adjusted by way of an OSD menu. The OSD menu is displayed on the screen of the device. A user can directly select and adjust a desired item shown on the screen, and visually confirm the adjustment.

FIG. 10 schematically illustrates a typical OSD menu displayed on a screen according to the prior art. The OSD menu has a plurality of symbols arranged in an elliptical ring, the symbols representing various parameters that can be adjusted. If a symbol is shaded, this indicates that the symbol has been selected by a user. A rectangular bar in the middle of the OSD menu represents a level meter of a selected parameter. A colored portion of the rectangular bar represents a current level of the parameter. The right side extremity of the colored portion fluctuates from left to right and back again according to adjustments made to the parameter.

The user can press a level increase button or a level decrease button, and thereby adjust the current level. Simultaneously, the user can view the result of the level adjustment on the level meter.

However, the level meter does not indicate exact adjustment values. It is difficult for the user to know the precise variation made by pressing the increase or decrease button. Additionally, all the optional items are simultaneously displayed on the OSD menu with the same size. The user can be confused, at least momentarily, as to which optional item is currently selected.

Accordingly, there is a need for an apparatus and method for displaying and controlling an OSD menu in an image display device, in which the above-described shortcomings are overcome.

SUMMARY OF THE INIVENTION

A main objective of the present invention is to provide an apparatus and method which can display and control an OSD menu in an image display device, whereby adjustments to a display parameter are accurately shown to a user, and a display parameter currently selected is readily apparent to the user.

To accomplish the above objective, an apparatus for displaying and controlling an OSD menu in an image display device in accordance with each of two preferred embodiments of the present invention comprises a key input unit, a control unit, an OSD menu generation unit, a storage unit, an image signal output unit, a pre-amplifier, an image output unit, and a liquid crystal display (LCD). The key input unit is for outputting a command signal for displaying and controlling function control targets in the OSD menu. The control unit is for outputting a control signal and control data to display the OSD menu on the LCD and determining whether to move the function control targets in the OSD menu in accordance with the command signal. The OSD menu generation unit is for receiving the control signal and the control data, and displaying the OSD menu.

The storage unit is for storing the control data and configured information of each function control target and related optional items thereof. The image signal output unit is for outputting image signals R, G, B. The pre-amplifier is for converting the image signals and the OSD image signals to predetermined voltages and outputting the resultant values in accordance with a blanking signal BLK. The image output unit is for amplifying and outputting the resultant values. The LCD is for displaying the resultant values received from the image output unit.

Further, the present invention provides a method for displaying and controlling an OSD menu in an image display device, the method comprising the steps of: (a) outputting a command signal for displaying the OSD menu; (b) displaying the OSD menu according to the command signal; (c) determining whether a desired optional item has been selected for adjustment; (d1) closing the OSD menu, if a desired optional item has not been selected for adjustment; or (d2) moving the selected optional item to an active area of the image display device, if a desired optional item has been selected for adjustment; (e) determining whether an elapsed period of not receiving any command signals is more than a predetermined threshold period; (f) keeping the OSD menu displayed, if the elapsed period is not more than the predetermined threshold period; (g) determining whether a configuration value of the selected optional item is required to be adjusted; and (h) adjusting the configuration value of the selected optional item and storing the adjusted configuration value, if the configuration value of the selected optional item is required to be adjusted.

Other objects, advantages and novel features of the present invention will be drawn from the following detailed description with reference to the attached drawings, in which:

DETAILED DESCRIPTION OF THE INVENTION

Figure 1:
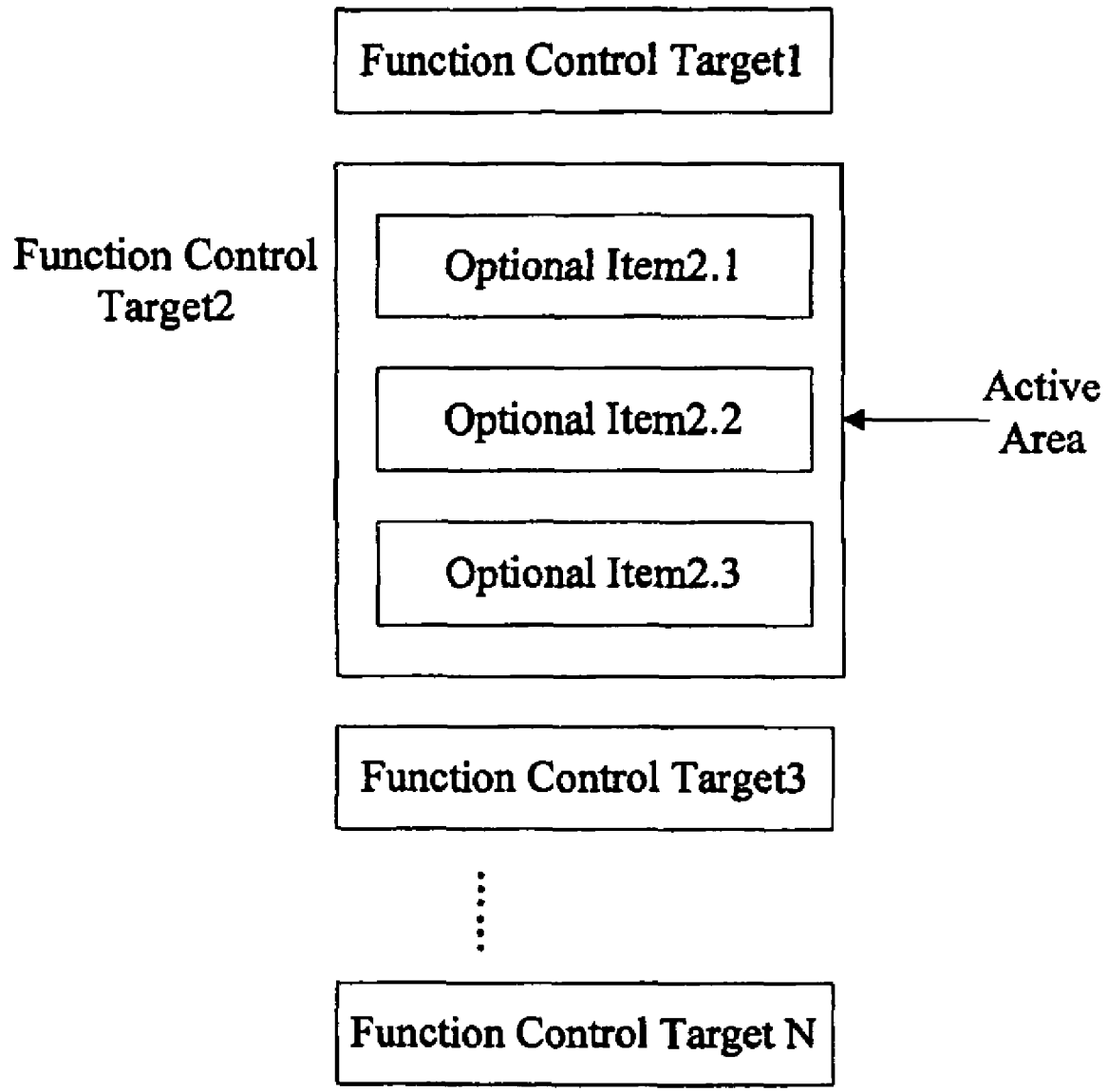
FIG. 1 schematically illustrates an on-screen display menu in accordance with the preferred embodiments of the present invention.

FIG. 1 schematically illustrates an on-screen display (OSD) menu in accordance with the preferred embodiments of the present invention. The menu includes N function control targets, symbolically depicted as function control target 1, function control target 2, function control target 3, and so on through to function control target N. Each function control target has a set of related optional items, and may be represented by a particular symbol such as a figure, characters or a figure-character combination. The size of each function control target is variable according to the position of the function control target on the display screen. That is, the function control target is displayed in a larger size when its position is at an active area of the screen. In contrast, the function control target is displayed in a smaller size when its position is away from the active area of the screen. Further or alternatively, when the position of a function control target is away from the active area of the screen, the function control target can be displayed in a faint mode. When the function control target is at the active area of the screen, the function control target can be expanded to show its related optional items. The related optional items can each be displayed in a particular mode, such as a flashing mode or a steady mode.

Figure 2:
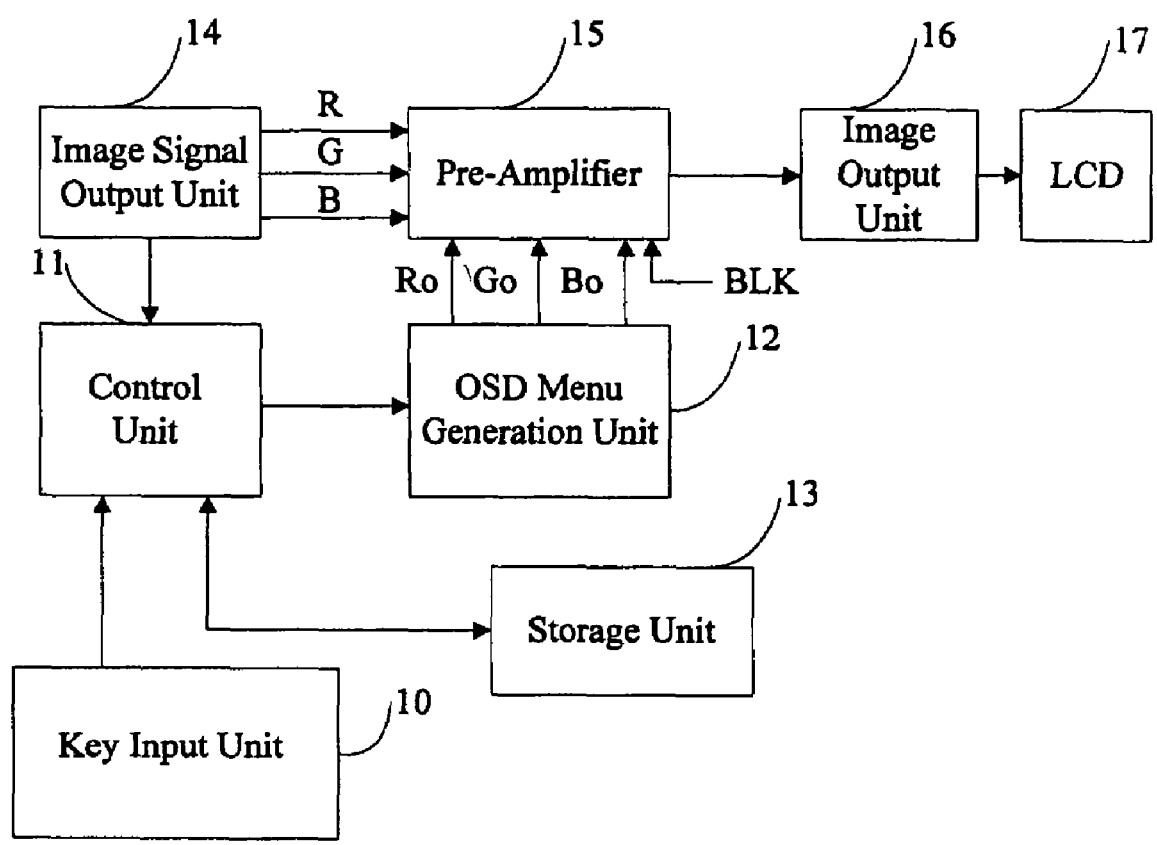
FIG. 2 is a block diagram of hardware infrastructure of an apparatus for controlling and displaying an OSD menu in accordance with the preferred embodiments of the present invention.

FIG. 2 is a block diagram of hardware infrastructure of an apparatus for displaying and controlling an OSD menu (hereinafter, "the apparatus") in accordance with the preferred embodiments of the present invention. The apparatus comprises a key input unit 10, a control unit 11, an OSD menu generation unit 12, a storage unit 13, an image signal output unit 14, a pre-amplifier 15, an image output unit 16, and a liquid crystal display (LCD) 17.

The key input unit 10 outputs a command signal for displaying and controlling function control targets in accordance with the manipulation of control keys by a user. The control unit 11 outputs a control signal and control data so as to display the OSD menu on the screen, and determines whether to move the function control targets in the OSD menu in accordance with the command signal. The OSD menu generation unit 12 receives the control signal and the control data, and outputs OSD image signals $R_O$, $G_O$, $B_O$ corresponding to the respective function control targets, thereby causing the function control targets to be displayed on the screen as an OSD menu.

The storage unit 13 stores the control data, and configured information of each function control target and of the related optional items of the function control target. The configured information of each function control target includes position coordinates and corresponding display symbols, so that the size of each function control target is variable in different position coordinates. The configured information of the related optional items includes configuration values, position coordinates, and corresponding display symbols at the active area. The position coordinates indicate different positions through which the function control target or the related optional item is moved.

The image signal output unit 14 outputs image signals R, G, B. The pre-amplifier 15 converts the image signals R, G, B and the OSD image signals $R_O$, $G_O$, $B_O$ into predetermined voltages, and outputs the resultant values in accordance with a blanking signal BLK. The image output unit 16 amplifies and outputs the resultant values. The LCD 17 displays the resultant values obtained from the image output unit 16.

Figure 3:
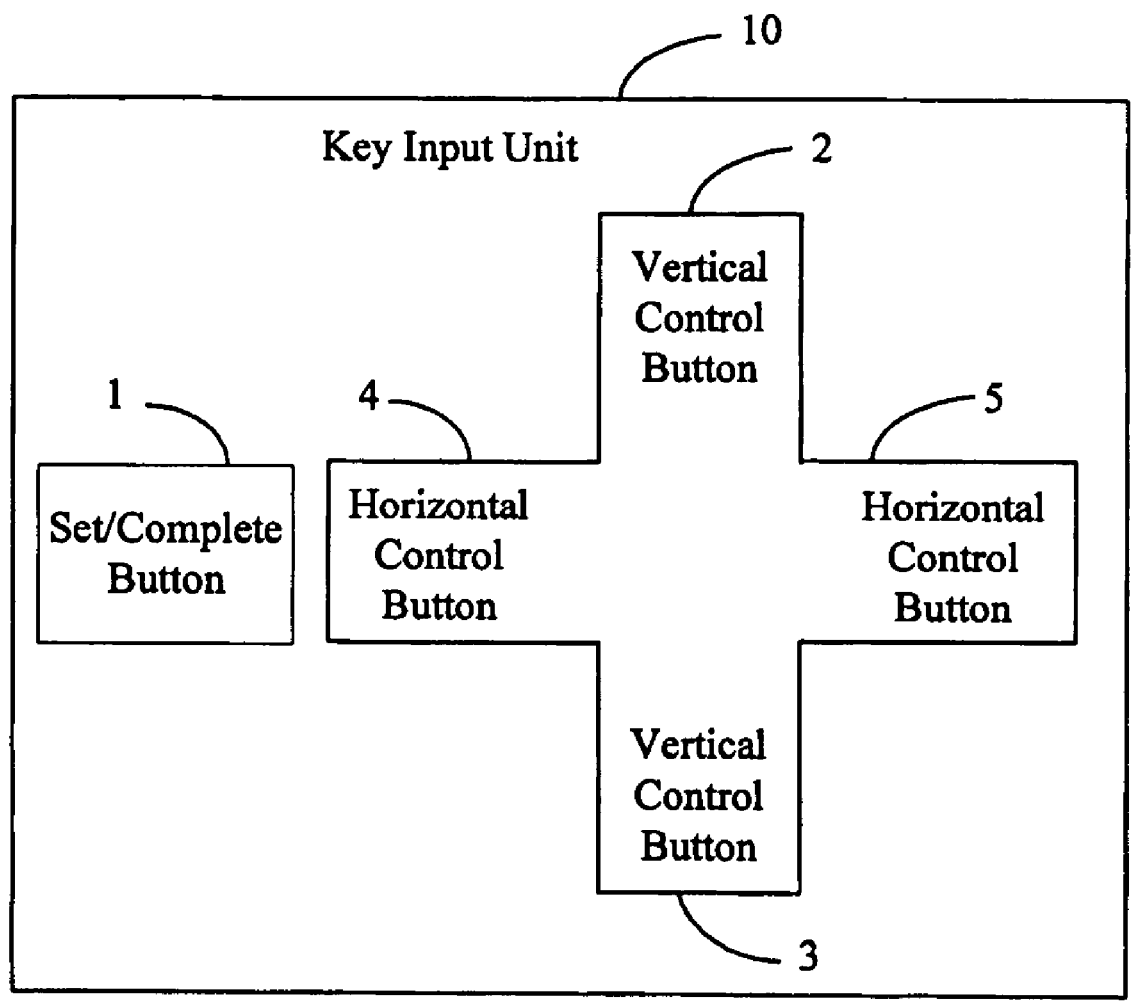
FIG. 3 is a schematic, plan view of a first embodiment of the key input unit, which is in accordance with the first embodiment of the present invention.

FIG. 3 is a schematic, plan view of a first embodiment of the key input unit 10, which is in accordance with the first embodiment of the present invention. The key input unit 10 comprises a set/complete button 1, a pair of vertical control buttons 2/3, and a pair of horizontal control buttons 4/5. The set/complete button 1 is for opening or closing an OSD menu. The vertical control buttons 2/3 are for vertically moving through a series of optional items displayed in the active area so as to reach a desired optional item. The horizontal control buttons 4/5 are for horizontally adjusting the configuration value of any desired optional item.

Figure 4:
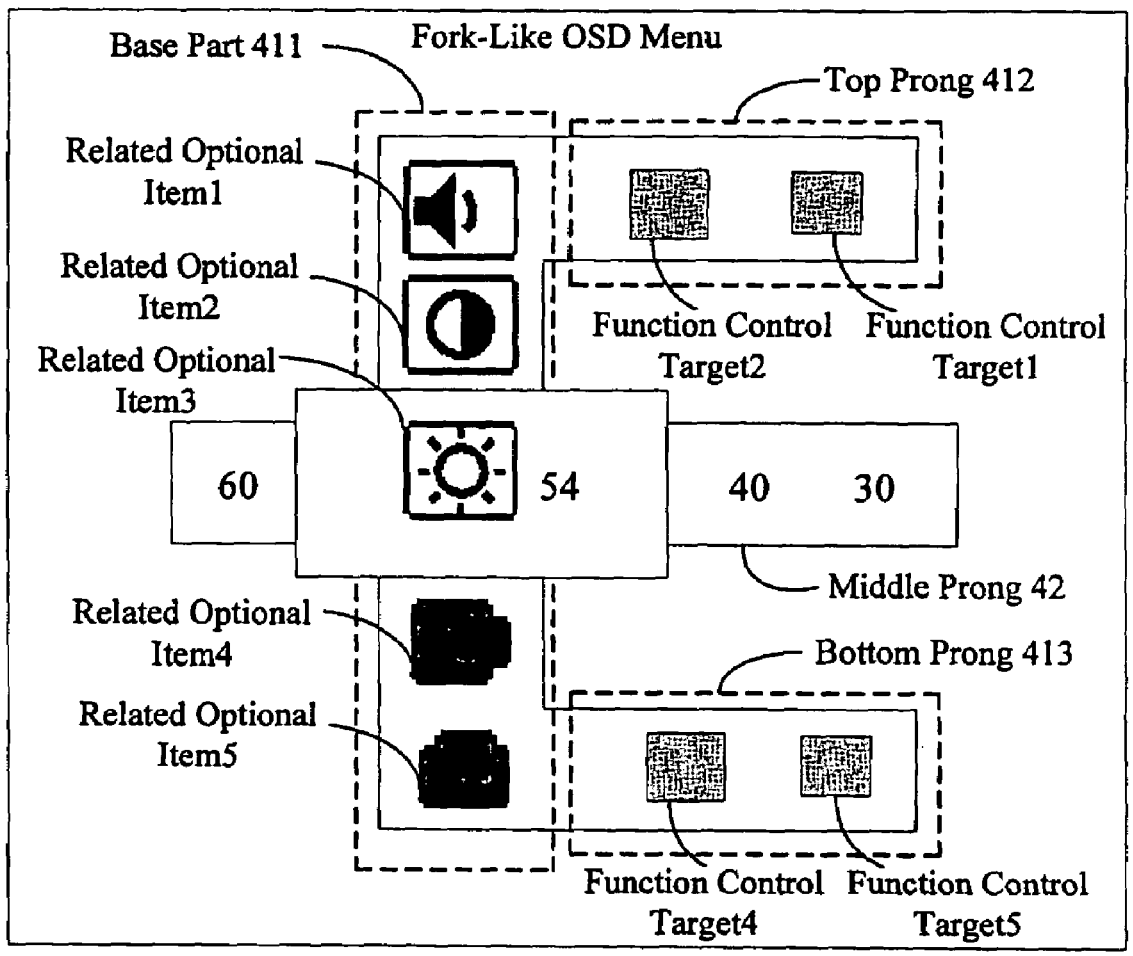
FIG. 4 is a schematic illustration of a fork-like OSD menu in accordance with the first embodiment of the present invention.

FIG. 4 is a schematic illustration of a fork-like OSD menu in accordance with the first embodiment of the present invention. The fork-like OSD menu comprises a vertical base part 411, a top prong 412, a middle prong 42, and a bottom prong 413. The middle prong 42 displays a configuration value of a selected optional item therein, and adjustment graduations for a user to adjust the configuration value.

The base part 411 is the active area, and comprises m (m being a prime number) spaces for displaying the related optional items of a selected function control target. The related optional item in a middle portion of the base part 411 is displayed in the flashing mode. The other related optional items in other portions of the base part 411 are displayed in the steady mode. The top prong 412 and the bottom prong 413 each comprise n (n being any natural number except 0) spaces for displaying other function control targets therein.

If there are any related optional items of the function control target that cannot be shown in the finite space of the base part 411, these related optional items are hidden. Similarly, if there are any function control targets that cannot be shown in the finite space of the top prong 412 or the finite space of the bottom prong 413, these function control targets are hidden.

In the first embodiment, it is assumed that the number of function control targets N is 6, the number of spaces n is 2, and the number of spaces m is 5. Further, it is assumed that the function control targets 1 and 2 are in the top prong 412, the function control target 3 is in the base part 411 and comprises 5 related optional items, and the function control targets 4 and 5 are in the bottom prong 413. For simplicity, the function control targets 1, 2, 4, 5 are all displayed in the faint mode. Nevertheless, the description should not be construed as limiting the invention to the faint mode.

According to the above description, and referring to FIG. 4, the function control target 3 is expanded into its five related optional items with corresponding display symbols (e.g., Volume1, Contrast2, Brightness3, Horizontal Position4, and Vertical Position5) in the base part 411. Brightness3 is in the middle portion of the base part 411. The configuration value 54 of Brightness3 is displayed at the right side of the display symbol, and adjustment graduations are displayed in the middle prong 42. The function control targets 1, 2, 4, 5 in the top prong 412 and the bottom prong 413 are displayed in corresponding sizes based on their current coordinates. That is, the function control targets 2 and 4 are displayed in a larger size, and the function control targets 1 and 5 are displayed in a smaller size. The other function control target 6 of the bottom prong 413 is hidden.

Figure 5:
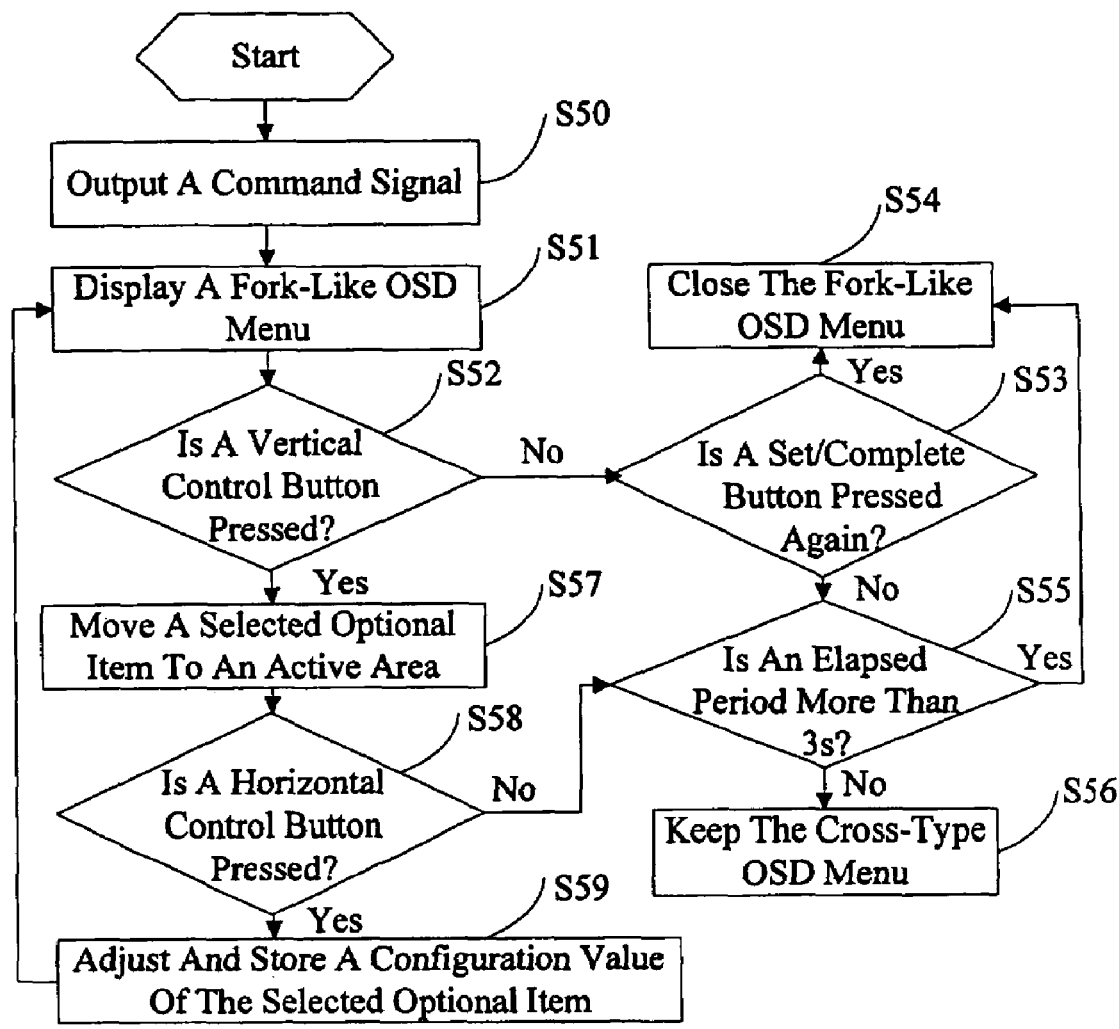
FIG. 5 is a flowchart of a preferred method for displaying and controlling a fork-like OSD menu in accordance with the first embodiment of the present invention.

FIG. 5 is a flowchart of a preferred method for displaying and controlling a fork-like OSD menu in accordance with the first embodiment of the present invention. In step S50, the set/complete button 1 is pressed and outputs a command signal for displaying the fork-like OSD menu. In step S51, the control unit 11 outputs a control signal and control data in accordance with the command signal, and the OSD menu generation unit 12 receives the control signal and the control data and displays the fork-like OSD menu on the LCD 17. In step S52, the control unit 11 determines whether either vertical control button 2 or 3 has been pressed to select a desired optional item to be adjusted. If either vertical control button 2 or 3 has been pressed, the procedure goes to step S57 described below. If neither of the vertical control buttons 2 and 3 has been pressed, in step S53, the control unit 11 determines whether the set/complete button 1 has been pressed again.

If the set/complete button 1 has been pressed again, in step S54, the fork-like OSD menu is closed, because the user wants to exit the fork-like OSD menu. In contrast, if the set/complete button 1 has not been pressed again, in step S55, the control unit 11 determines whether an elapsed period of not receiving any command signals from the horizontal button 5 or 6 is more than 3 seconds. If the elapsed period of not receiving any command signals is more than 3 seconds, the procedure goes to step S54 described above. In contrast, if the elapsed period of not receiving any command signals is not more than 3 seconds, in step S56, the fork-like OSD menu is kept on display on the LCD 17.

In step S57, the control unit 11 moves the selected optional item to the middle portion of the base part 411. In step S58, the control unit 11 determines whether either horizontal control button 4 or 5 has been pressed. If neither of the horizontal control buttons 4 and 5 has been pressed, the procedure goes to step S55 described above. In contrast, if either horizontal control button 4 or 5 has been pressed, in step S59, the control unit 11 adjusts the configuration value of the selected optional item in the middle space of the base part 411 according to the command signals from the horizontal control button 4 or 5, and stores the adjusted configuration value in the storage unit 13. The procedure then returns to step S51 described above.

Figure 6:
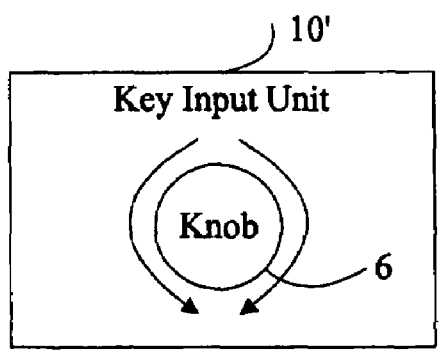
FIG. 6 is a schematic, plan view of a second embodiment of the key input unit, which is in accordance with the second embodiment of the present invention.

FIG. 6 is a schematic, plan view of a second embodiment of the key input unit 10, which is designated as a key input unit 10'. The key input unit 10' is in accordance with the second embodiment of the present invention. The key input unit 10' comprises a knob 6. The user performs press or rotation operations on the knob 6 to display or control function control targets. The key input unit 10' then outputs a command signal in accordance with the manipulation of the knob 6 by the user.

Figure 7:
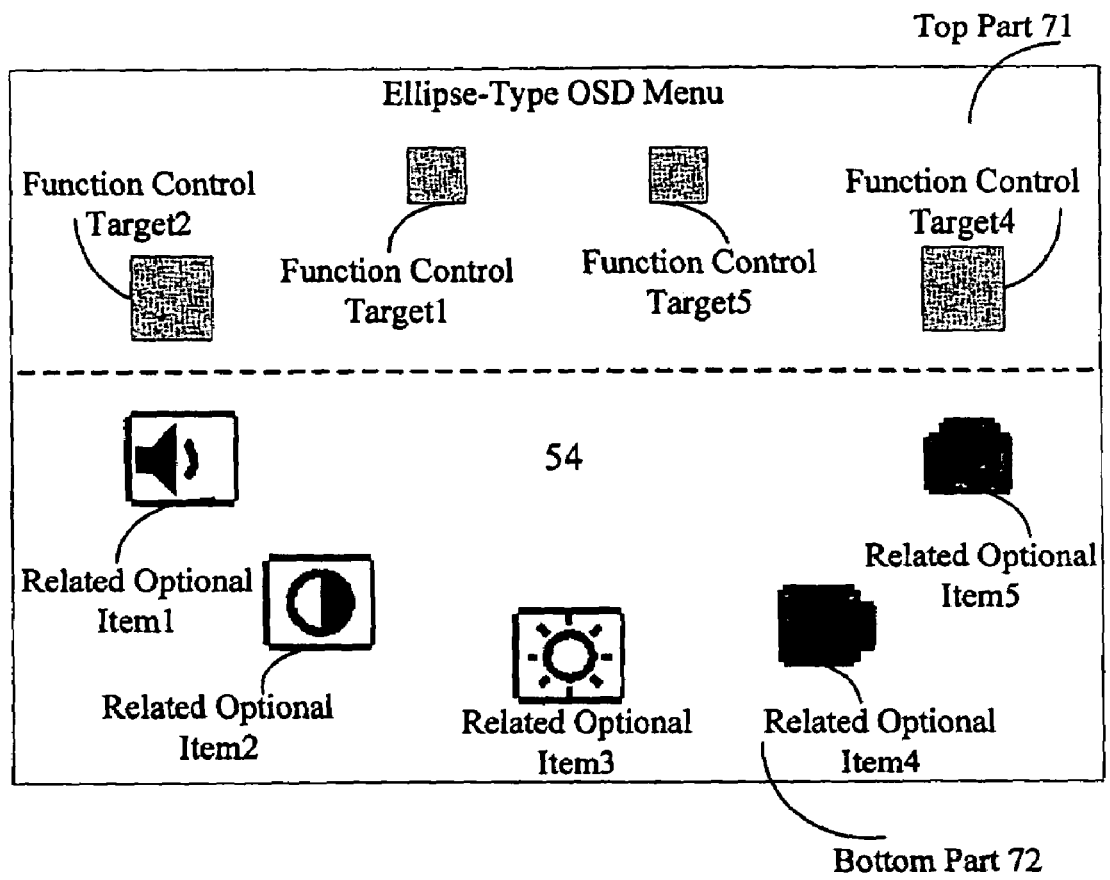
FIG. 7 is a schematic illustration of an ellipse-type OSD menu in accordance with the second embodiment of the present invention.

FIG. 7 is a schematic illustration of an ellipse-type OSD menu in accordance with the second embodiment of the present invention. The ellipse-type OSD menu is divided into two parts (as per the broken line): a top part 71 and a bottom part 72. The bottom part 72 is the active area, and comprises m (m being a prime number) spaces for displaying related optional items of a selected function control target. The related optional item in a middle portion of the bottom part 72 is displayed in the flashing mode, with a corresponding configuration value displayed above the display symbol. The other related optional items in the other portions of the bottom part 72 are displayed in the steady mode. The top part 71 comprises n (n being any natural number except 0) spaces for displaying the other function control targets therein.

If there are any related optional items of the function control target that cannot be shown in the finite space of the bottom part 72, these related optional items are hidden. Similarly, if there are any function control targets that cannot be shown in the finite space of the top part 71, these function control targets are hidden.

In the second embodiment, it is assumed that the number of function control targets N is 6, the number of spaces n is 4, and the number of spaces m is 5. Further, it is assumed that the function control targets 1, 2, 4, 5 are in the top part 71, and the function control target 3 is in the bottom part 72 and comprises 5 related optional items. For simplicity, the function control targets 1, 2, 4 and 5 are displayed in the faint mode. Nevertheless, the description should not be construed as limiting the invention to the faint mode.

According to the above description, and referring to FIG. 7, the function control target 3 is expanded into its five related optional items with corresponding display symbols (e.g., Volume1, Contrast2, Brightness3, Horizontal Position4, and Vertical Position5) in the bottom part 72. Brightness3 is in the middle portion of the bottom part 72. The configuration value 54 of Brightness3 is displayed above the display symbol. The function control targets 2 and 4 are displayed in a larger size, and the function control targets 1 and 5 are displayed in a smaller size. The other function control target 6 of the top part 71 is hidden.

Figure 8:
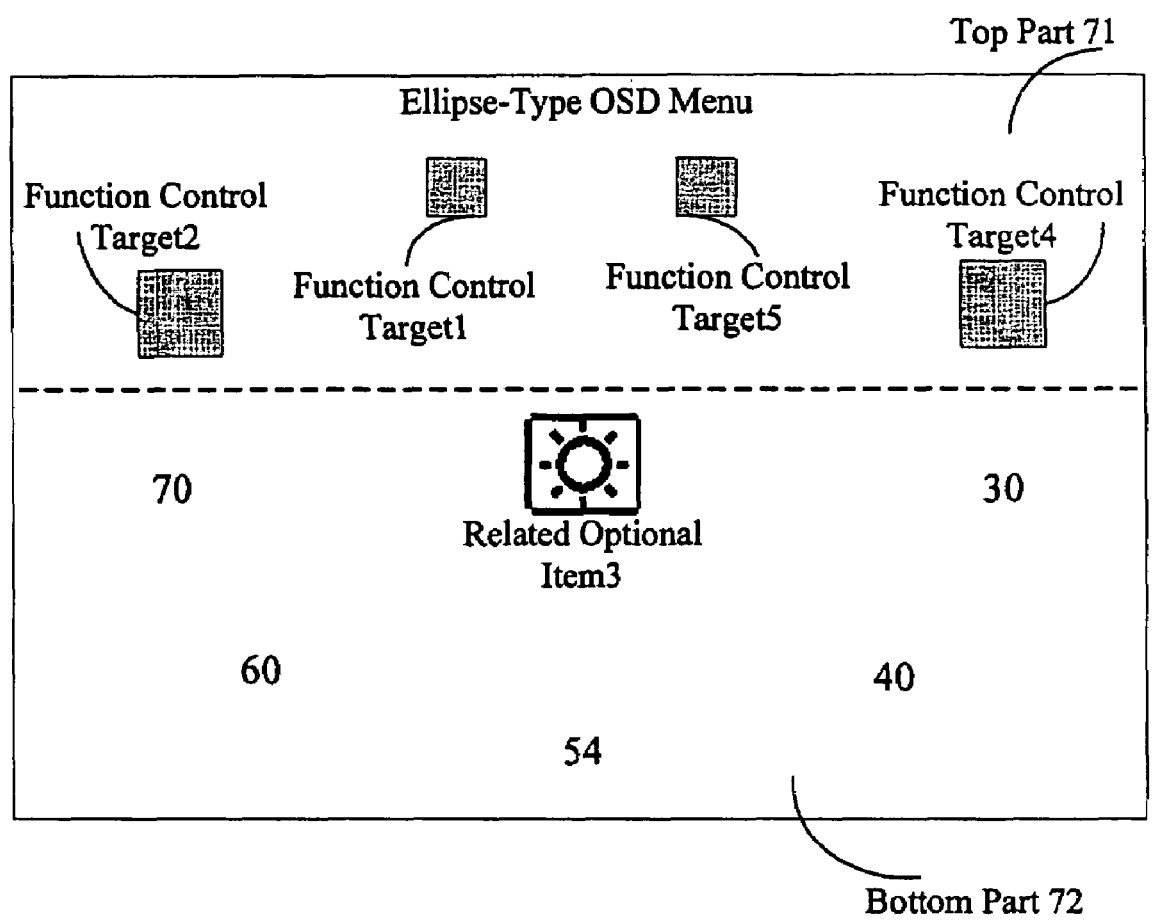
FIG. 8 is a schematic illustration of a configuration value and adjustment graduations of a selected optional item of an expanded function control target of an ellipse-type OSD menu.

FIG. 8 is a schematic illustration of a configuration value and adjustment graduations of a selected optional item of an expanded function control target of an ellipse-type OSD menu. Referring also to FIG. 7, it is assumed that Brightness3 is in the middle portion of the bottom part 72, and that Brightness3 is the desired optional item. When Brightness3 is selected, the ellipse-type OSD menu changes its display to a mode illustrated in FIG. 8. That is, the bottom part 72 displays the configuration value and the adjustment graduations of Brightness3. The display symbol of Brightness3 is above the configuration value.

Figure 9:
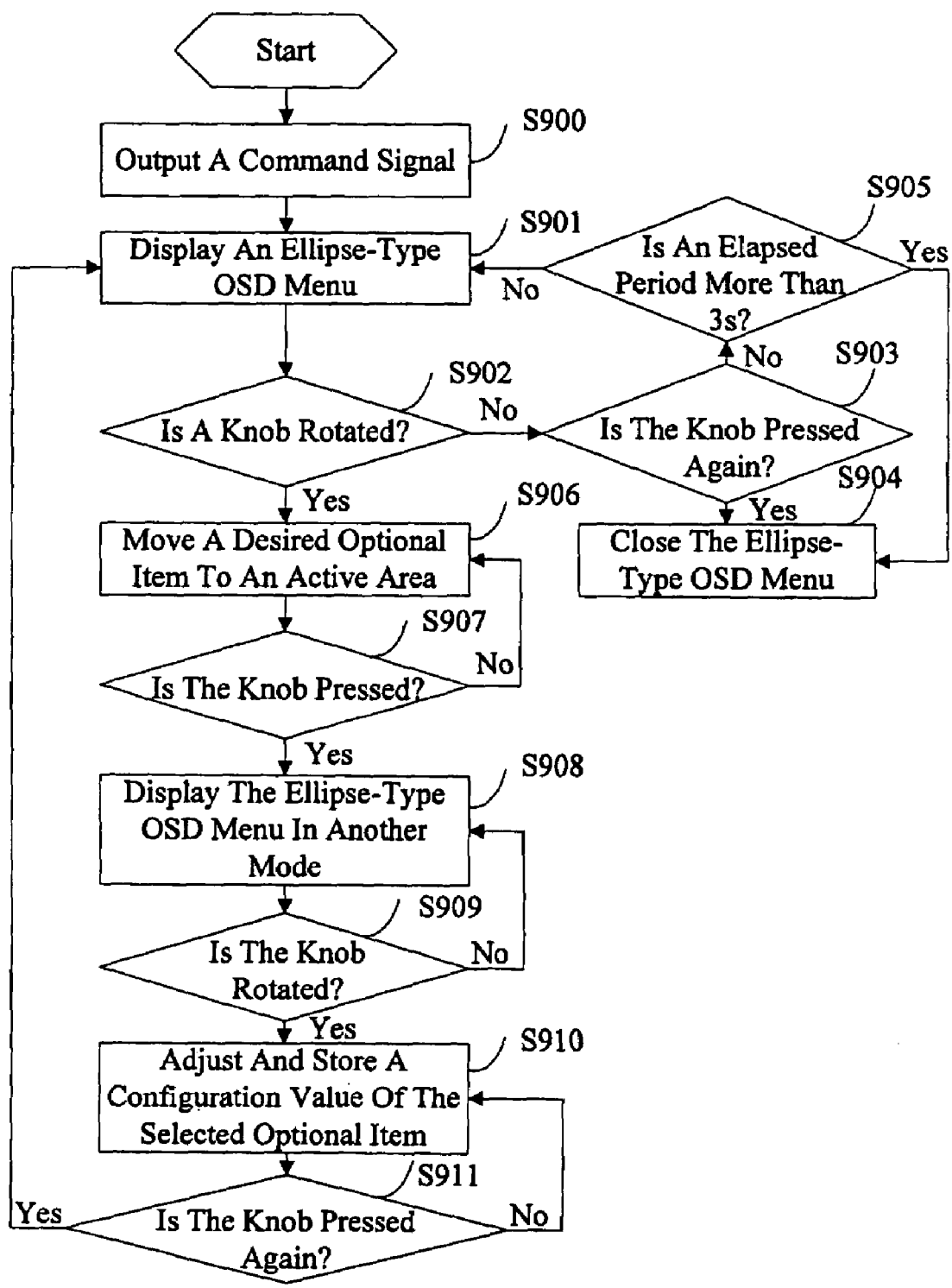
FIG. 9 is a flowchart of a preferred method for controlling and displaying an ellipse-typed OSD menu in accordance with the second embodiment of the present invention.
Figure 10:
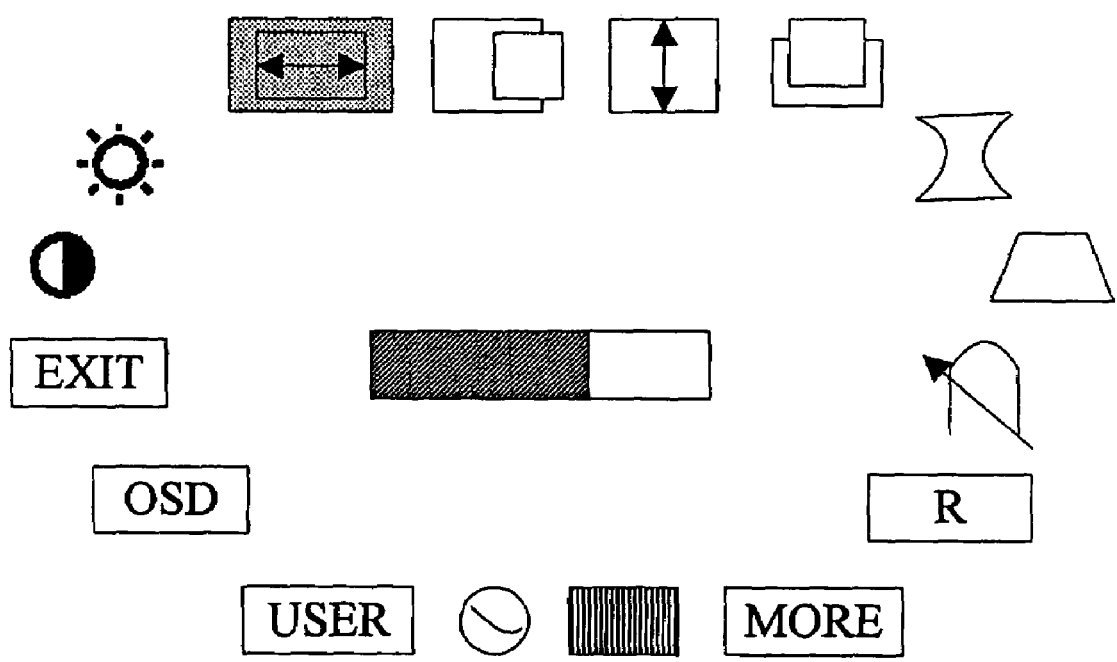
FIG. 10 is a schematic diagram illustrating an OSD menu being displayed on a screen with regard to a plurality of optional items according to the prior art.

FIG. 9 is a flowchart of a preferred method for displaying and controlling an ellipse-typed OSD menu in accordance with the second embodiment of the present invention. In step S900, the knob 6 is pressed and outputs a command signal for displaying the ellipse-type OSD menu, such as that shown in FIG. 7. In step S901, the control unit 11 outputs a control signal and control data in accordance with the command signal, and the OSD menu generation unit 12 receives the control signal and the control data and displays the ellipse-type OSD menu on the LCD 17. In step S902, the control unit 11 determines whether the knob 6 has been rotated either clockwise or counterclockwise to select a desired optional item to be adjusted. If the knob 6 has been rotated either clockwise or counterclockwise, the procedure goes to step S906 described below. If the knob 6 has not been rotated, in step S903, the control unit 11 determines whether the knob 6 has been pressed again.

If the knob 6 has been pressed again, in step S904, the ellipse-type OSD menu is closed, because the user wants to exit the ellipse-type OSD menu. In contrast, if the knob 6 has not been pressed again, in step S905, the control unit 11 determines whether an elapsed period of not receiving any command signals from the knob 6 is more than 3 seconds. If the elapsed period of not receiving any command signals is more than 3 seconds, the procedure goes to step S904 described above. In contrast, if the elapsed period of not receiving any command signals is not more than 3 seconds, the procedure returns to step S901 described above.

In step S906, the control unit 11 moves the selected desired optional item to the middle portion of the bottom part 72. In step S907, the control unit 11 determines whether the knob 6 has been pressed. If the knob 6 has not been pressed, the procedure returns to step S906 described above. In contrast, if the knob 6 has been pressed, in step S908, the ellipse-type menu is displayed in another mode, such as that shown in FIG. 8. In step S909, the control unit 11 determines whether the knob 6 has been rotated either clockwise or counterclockwise to adjust the configuration value of the selected optional item. If the knob 6 has been rotated, in step S910, the control unit 11 adjusts the configuration value of the selected optional item in the middle portion of the bottom part 72 according to command signals from the knob 6, and stores the adjusted configuration value in the storage unit 13. In step S911, the control unit 11 determines whether the knob 6 has been pressed again. If the knob has not been pressed again, the procedure returns to step S910 described above. If the knob has been pressed again, the procedure returns to step S901 described above.

Although the present invention has been specifically described on the basis of a preferred embodiment and preferred methods, the invention is not to be construed as being limited thereto. Various changes or modifications may be made to the embodiment and methods without departing from the scope and spirit of the invention.

What is claimed is:

1. An apparatus for displaying and controlling an on-screen display (OSD) menu in an image display device, the apparatus comprising:
    a key input unit for outputting command signals for displaying and controlling function control targets in the OSD menu;
    a control unit for outputting a control signal and control data to display the OSD menu, and determining whether to move the function control targets and select a related optional item thereof for adjusting according to the command signals;
    an OSD menu generation unit for receiving the control signal and the control data and outputting OSD image signals to display the OSD menu;
    a storage unit for storing the control data and configuration information of the function control targets and related optional items of the function control targets;
    an image signal output unit for outputting second image signals;
    a pre-amplifier for converting the second image signals and the OSD image signals to predetermined voltages and outputting resultant values;
    an image output unit for amplifying and outputting the resultant values; and
    the image display device, for displaying the resultant values received from the image output unit;
    wherein each of the function control targets is moved and displayed in a different size according to its display position, and each of the function control targets can be expanded into its related optional items at an active area of the image display device when the function control target is at the active area, and wherein the related optional item in a middle portion of the active area is displayed in a particular mode for indicating the related optional item is a selected related optional item.

2. The apparatus according to claim 1, wherein the key input unit comprises a set of control buttons.

3. The apparatus according to claim 2, wherein the set of control buttons comprises a set/complete button, a pair of vertical control buttons, and a pair of horizontal control buttons.

4. The apparatus according to claim 3, wherein the set/complete button is for outputting a command signal to open or close the OSD menu.

5. The apparatus according to claim 3, wherein the pair of vertical control buttons are for outputting command signals to select a desired optional item.

6. The apparatus according to claim 3, wherein the pair of horizontal control buttons are for outputting command signals to adjust configuration information of the selected desired optional item.

7. The apparatus according to claim 1, wherein the key input unit is a knob, and the knob is for pressing or rotating to output command signals.

8. The apparatus according to claim 1, wherein the configuration information of the function control targets comprise display symbols of the function control targets, and position coordinates of the function control targets at different display positions.

9. The apparatus according to claim 8, wherein the configuration of the related optional items comprise configuration values, position coordinates, and display symbols of the related optional items, wherein the position coordinates indicate different positions through which the function target or the related optional item is moved.

10. The apparatus according to claim 1, wherein the OSD menu is a fork-like OSD menu or an ellipse-type OSD menu.

11. An electronics-based method for displaying and controlling an on-screen display (OSD) menu in an image display device, the method comprising:
    (a) outputting a command signal for displaying the OSD menu;
    (b) displaying the OSD menu according to the command signal, wherein the OSD menu includes a plurality of function control targets, each of the function control targets is displayed in a different size according to its display position, each of the function control targets includes a set of related optional items, and can be expanded into its related optional items when the function control target is at an active area of the image display device, and wherein the related optional item in a middle portion of the active area is displayed in a particular mode for indicating the related optional item is a selected related optional item;
    (c) determining whether a desired optional item has been selected for adjustment;
    (d1) closing the OSD menu, if a desired optional item has not been selected for adjustment; or
    (d2) moving the selected optional item to the middle portion of the active area of the image display device, if a desired optional item has been selected for adjustment;
    (e) determining whether an elapsed period of not receiving any command signals is more than a predetermined threshold period;
    (f) keeping the OSD menu displayed, if said elapsed period is not more than the predetermined threshold period;
    (g) determining whether a configuration value of the selected optional item is required to be adjusted; and
    (h) adjusting the configuration value of the selected optional item and storing the adjusted configuration value, if the configuration value of the selected optional item is required to be adjusted.

12. The method according to claim 11, further comprising the step of determining whether the OSD menu is required to be closed, and closing the OSD menu if it is required to be closed.

13. The method according to claim 11, further comprising the step of closing the OSD menu, if the elapsed period is more than the predetermined threshold period.

14. The method according to claim 11, further comprising the step of returning to step (e), if the configuration value of the selected optional item is not required to be adjusted.

15. The method according to claim 11 wherein the OSD menu is a fork-like OSD menu or an ellipse-type OSD menu.

16. A method for displaying and controlling an on-screen display (OSD) menu on an image display device, comprising the steps of:

grouping optional items of said OSD menu into a plurality of function control targets;

creating an active area on said image display device for said OSD menu;

moving a user-selected one of said plurality of function control targets into said active area;

displaying emphatically a user-selected optional item from said user-selected one of said plurality of function control targets in said active area to facilitate further user operation on said user-selected optional item.

17. The method according to claim 16, further comprising the step of displaying less-emphatically the other optional items of said user-selected one of said plurality of function control targets in said active area.

18. The apparatus according to claim 10, wherein the function control target is displayed in a larger size when its display position is at the active area, and is displayed in a smaller size when its display position is away from the active area.

19. The apparatus according to claim 18, wherein the function control target(s) and/or related optional item(s) are hidden when they cannot be shown in the OSD menu.

20. The method according to claim 11, wherein the function control target is displayed in a larger size when its display position is at the active area, and is displayed in a smaller size when its display position is away from the active area.

21. The method according to claim 20, wherein the function control target(s) and/or related optional item(s) are hidden when they cannot be shown in the OSD menu.

22. The apparatus according to claim 16, wherein said user-selected one of said plurality of function control targets is displayed in a larger size when its display position is in said active area, and is displayed in a smaller size when its display position is away from said active area.

* * * * *